(12) United States Patent
Yamaguchi

(10) Patent No.: US 9,314,700 B2
(45) Date of Patent: Apr. 19, 2016

(54) INFORMATION PROCESSING DEVICE AND GAME PROGRAM

(71) Applicant: DeNA Co., Ltd., Tokyo (JP)

(72) Inventor: Kyohei Yamaguchi, Tokyo (JP)

(73) Assignee: DeNA Co., Ltd, Tokyo (JP)

( * ) Notice: Subject to any disclaimer, the term of this patent is extended or adjusted under 35 U.S.C. 154(b) by 0 days.

(21) Appl. No.: 14/531,167

(22) Filed: Nov. 3, 2014

(65) Prior Publication Data

US 2015/0190715 A1   Jul. 9, 2015

(30) Foreign Application Priority Data

Jan. 8, 2014   (JP) .................................. 2014-001616

(51) Int. Cl.
*A63F 9/24* (2006.01)
*A63F 13/00* (2014.01)
*A63F 13/63* (2014.01)
*A63F 13/69* (2014.01)
*A63F 13/825* (2014.01)

(52) U.S. Cl.
CPC ................. *A63F 13/63* (2014.09); *A63F 13/69* (2014.09); *A63F 13/825* (2014.09)

(58) Field of Classification Search
CPC ......... A63F 13/40; A63F 13/42; A63F 13/45; A63F 13/47–13/49; A63F 13/63; A63F 13/69; A63F 13/75; A63F 13/77; A63F 13/79; A63F 13/798; A63F 13/822; A63F 13/825; A63F 2300/55; A63F 2300/5526; A63F 2300/5533; A63F 2300/554; A63F 2300/5546; A63F 2300/559; A63F 2300/5596; A63F 2300/60; A63F 2300/6009; A63F 2300/6018; A63F 2300/609; A63F 2300/65; A63F 2300/807

See application file for complete search history.

(56) References Cited

U.S. PATENT DOCUMENTS

2007/0082720 A1*  4/2007  Bradbury et al. ................. 463/9
2008/0139318 A1*  6/2008  Van Luchene et al. ......... 463/42
(Continued)

FOREIGN PATENT DOCUMENTS

JP       200016937 A    4/2000
JP         5153960 B   12/2012
(Continued)

OTHER PUBLICATIONS

Japanese Patent Application No. 2014-001616: Decision to Grant mailed on Aug. 26, 2014.

(Continued)

*Primary Examiner* — Milap Shah
(74) *Attorney, Agent, or Firm* — Procopio, Cory, Hargreaves & Satitch LLP

(57) ABSTRACT

The information processing device according to the present invention fuses a basic first game content and a second game content used as source material for fusion before a preset condition related to fusing the first game content and second game content is satisfied, thereby varying the upper limits of parameters configured in the first game content in a stepwise manner, and, once the preset condition is satisfied, initializes the parameters configured in said first game content while at the same time providing items capable of increasing at least the initialized parameters configured in said first game content.

6 Claims, 12 Drawing Sheets

(56) References Cited

U.S. PATENT DOCUMENTS

| | | | | |
|---|---|---|---|---|
| 2008/0274805 A1* | 11/2008 | Ganz et al. | | 463/29 |
| 2008/0274811 A1* | 11/2008 | Ganz et al. | | 463/42 |
| 2009/0305756 A1* | 12/2009 | Blair et al. | | 463/1 |
| 2010/0210364 A1* | 8/2010 | York et al. | | 463/43 |
| 2011/0131510 A1* | 6/2011 | DeLuca et al. | | 715/757 |
| 2011/0256937 A1* | 10/2011 | Van Luchene | | 463/42 |
| 2012/0083322 A1* | 4/2012 | Van Luchene | | 463/1 |
| 2014/0342808 A1* | 11/2014 | Chowdhary et al. | | 463/24 |
| 2015/0065255 A1* | 3/2015 | Otomo | | 463/43 |

FOREIGN PATENT DOCUMENTS

| | | |
|---|---|---|
| JP | 5204330 B | 2/2013 |
| JP | 2013-226272 A | 11/2013 |

OTHER PUBLICATIONS

Japanese Patent Application No. 2014-001616: Office Action mailed on Apr. 1, 2014.

"Dark Cloud", "Dengeki PlayStation, vol. 159", MediaWorks, Inc., Nov. 10, 2000, vol. 6, No. 29, pp. 108-109.

Dark Cloud, "Dengeki PlayStation vol. 166", MediaWorks, Inc., Jan. 26, 2001, vol. 7, No. 3, pp. 74-77.

"V Jump Books [Game Series], PlayStation 2 Edition, Dark Cloud", Issue 1, Shueisha Inc., Dec. 19, 2000, pp. 032, 086,102.

"PERSONA2 Crime", "Dengeki PlayStation vol. 493", ASCII Media Works, Inc., Apr. 14, 2011, vol. 17, No. 12, pp. 10-13 (in particular, the section "Persona to Items at MAX rank!" on the left-hand side of p. 13).

* cited by examiner

| Character ID | Character Name | Character Image | Rarity | Item ID | Initial Attack Power | Initial Defense Power | Initial Physical Strength |
|---|---|---|---|---|---|---|---|
| 0001 | Character A | | Common | 0015 | 15 | 8 | 10 |
| 0002 | Character B | | Uncommon | 0123 | 30 | 20 | 15 |
| 0003 | Character C | | Rare | 1011 | 45 | 30 | 25 |
| 0004 | Character D | | Super-rare | 0807 | 60 | 55 | 60 |
| ... | ... | ... | ... | ... | ... | ... | ... |

| Initial Upper Attack Power Limit | Initial Upper Defense Power Limit | Initial Upper Physical Strength Limit | $2^{nd}$ Upper Attack Power Limit | $2^{nd}$ Upper Defense Power Limit | $2^{nd}$ Upper Physical Strength Limit | $3^{rd}$ Upper Attack Power Limit | $3^{rd}$ Upper Defense Power Limit | $3^{rd}$ Upper Physical Strength Limit |
|---|---|---|---|---|---|---|---|---|
| 100 | 100 | 100 | 120 | 120 | 120 | 150 | 150 | 150 |
| 300 | 300 | 300 | 320 | 320 | 320 | 350 | 350 | 350 |
| 600 | 600 | 600 | 650 | 650 | 650 | 700 | 700 | 700 |
| 1000 | 1000 | 1000 | 1100 | 1100 | 1100 | 1200 | 1200 | 1200 |
| ... | ... | ... | ... | ... | ... | ... | ... | ... |

FIG. 4

| Item ID | Item Name | Parameter Increment |
|---------|-----------|---------------------|
| 0001 | Item A | 10 |
| 0002 | Item B | 20 |
| 0003 | Item C | 30 |
| . | . | . |
| . | . | . |
| . | . | . |

FIG. 5

| Player ID | Virtual Medals | Automatic Fusion Configuration | Proprietary Character Information | Proprietary Item Information |
|-----------|----------------|-------------------------------|-----------------------------------|------------------------------|
| 1 | 50 | ON | Proprietary Character Information (1) | Proprietary Item Information (1) |
| 2 | 20 | ON | Proprietary Character Information (2) | Proprietary Item Information (2) |
| 3 | 100 | OFF | Proprietary Character Information (3) | Proprietary Item Information (3) |
| 4 | 0 | OFF | Proprietary Character Information (4) | Proprietary Item Information (4) |
| 5 | 10 | ON | Proprietary Character Information (5) | Proprietary Item Information (5) |
| 6 | 150 | OFF | Proprietary Character Information (6) | Proprietary Item Information (6) |
| . | . | . | . | . |
| . | . | . | . | . |
| . | . | . | . | . |

FIG. 6

| Proprietary Character Information (3) | | | | | | | | | | |
| Proprietary Character Information (2) | | | | | | | | | | 0 |
| Proprietary Character Information (1) | | | | | | | | | 0 | 0 |
| Character ID | Item ID | Attack Power | Defense Power | Physical Strength | Upper Attack Power Limit | Upper Defense Power Limit | Upper Physical Strength Limit | frequency of fusion | 0 | 0 |
|---|---|---|---|---|---|---|---|---|---|---|
| 0011 | 0022 | 15 | 10 | 200 | 200 | 200 | 200 | 0 | 0 | 0 |
| 0211 | 0081 | 20 | 23 | 150 | 150 | 150 | 150 | 0 | 0 | 1 |
| 0133 | - | 70 | 45 | 100 | 100 | 200 | 100 | 0 | 1 | 0 |
| 0201 | 0113 | 22 | 40 | 600 | 500 | 600 | 700 | 1 | 0 | 3 |
| 0072 | - | 60 | 50 | 250 | 200 | 200 | 300 | 0 | 3 | |
| 0094 | 0321 | 300 | 200 | 450 | 600 | 600 | 600 | 3 | | |
| . | . | . | . | . | . | . | . | . | | |
| . | . | . | . | . | . | . | . | . | | |
| . | . | . | . | . | . | . | . | . | | |

FIG. 7

| Proprietary Item Information (1) | |
|---|---|
| Item ID | Number of Items Owned |
| 0001 | 20 |
| 0002 | 10 |
| 0003 | 1 |
| ⋮ | ⋮ |

# INFORMATION PROCESSING DEVICE AND GAME PROGRAM

The present application claims the benefit of foreign priority under 35 USC 119 based on Japanese Patent Application No. 2014-001616, filed Jan. 8, 2014, the contents of which is incorporated herein by reference in its entirety.

TECHNICAL FIELD

The present invention relates to an information processing device and a game program.

BACKGROUND ART

Game systems are known in which parameters configured in basic game content are varied by fusing the basic game content with game content used as source material for fusion (for example, see Patent Document 1).

PRIOR ART DOCUMENTS

Patent Documents

[Patent Document 1]
Japanese Patent Publication No. 5,204,330

SUMMARY OF THE INVENTION

Problems to be Solved by the Invention

Although in such game systems the player can continue to gradually increase and enhance the parameters configured in the basic game content by repeatedly fusing the basic game content and the game content used as source material for fusion, there is a certain limit to that. Since further enhancement of the basic game content becomes impossible once the limit is attained, game content fusion is no longer repeated.

The present invention has been devised by taking such circumstances into consideration, and it is an object of the invention to motivate players to repeatedly fuse game content.

Means for Solving the Problems

The main inventive idea of the present invention, which intends to resolve the above-mentioned problem, is an information processing device characterized by being provided with: a determination processing unit, which determines whether or not a preset condition related to fusing a basic first game content and a second game content used as source material for fusion has been satisfied; a fusion processing unit which, before the preset condition is satisfied, varies the upper limits of parameters configured in said first game content in a stepwise manner by fusing the second game content with the first game content; and a benefit provision processing unit which, once the preset condition is satisfied, initializes the parameters configured in said first game content while providing items capable of increasing at least the initialized parameters configured in said first game content.

Other features of the present invention will become apparent from this description and the accompanying drawings.

BRIEF DESCRIPTION OF THE DRAWINGS

[FIG. 4] A diagram showing an example data structure of character information.

[FIG. 5] A diagram showing an example data structure of item information.

[FIG. 6] A diagram showing an example data structure of player information.

[FIG. 7] A diagram showing an example data structure of proprietary character information.

MODE FOR CARRYING OUT THE INVENTION

Figure 1:
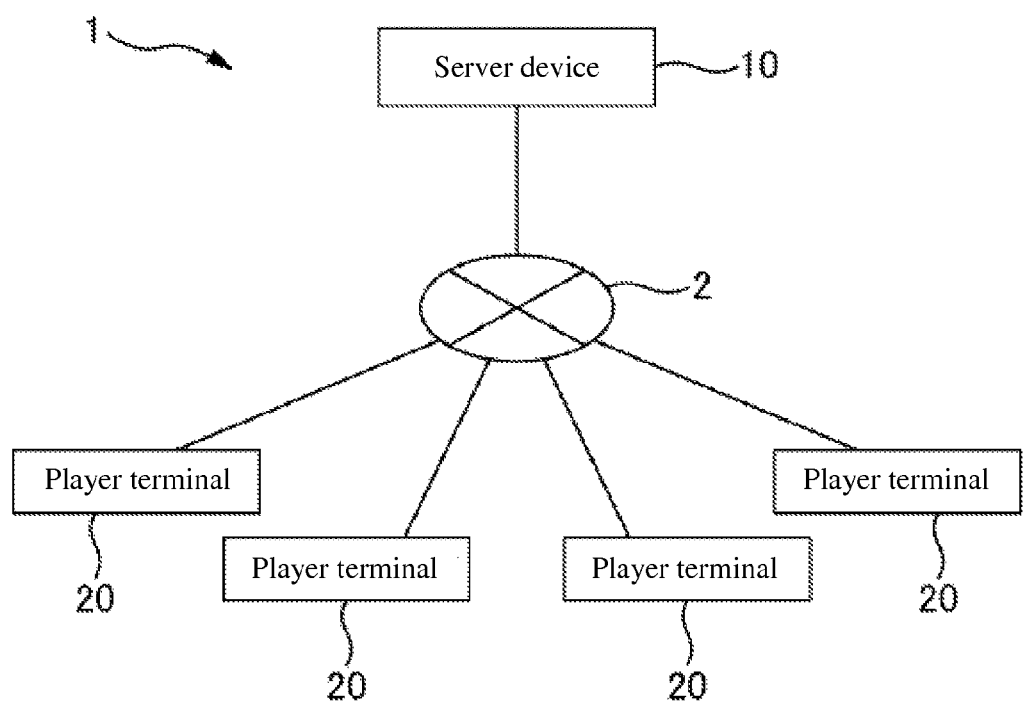
[FIG. 1] A diagram showing an example configuration of the entire game system 1.

At least the following will become apparent from this description and the accompanying drawings.

Namely, the invention is an information processing device characterized by being provided with: a determination processing unit, which determines whether or not a preset condition related to fusing a basic first game content and a second game content used as source material for fusion has been satisfied; a fusion processing unit which, before the preset condition is satisfied, varies the upper limits of parameters configured in said first game content in a stepwise manner by fusing the second game content with the first game content; and a benefit provision processing unit which, once the preset condition is satisfied, initializes the parameters configured in said first game content while providing items capable of increasing at least the initialized parameters configured in said first game content.

In such an information processing device, before the preset condition is satisfied, repeated fusion allows for the first game content to be enhanced in a stepwise manner, and, once the preset condition is satisfied, repeated fusion makes it possible to once again continue enhancing the initialized first game content. For this reason, the player's motivation to repeat game content fusion can be increased. Moreover, after the preset condition is satisfied, the initialized first game content can be dramatically enhanced using the provided item.

Further, the invention is an information processing device characterized by being provided with: a determination processing unit, which determines whether or not a preset condition related to fusing a basic first game content and a second game content used as source material for fusion has been satisfied; a fusion processing unit which, before the preset condition is satisfied, varies the upper limits of parameters configured in said first game content in a stepwise manner by fusing the second game content with the first game content; and a benefit provision processing unit which, once the preset condition is satisfied, changes said first game content into other game content while providing items capable of increasing at least the parameters configured in said other game content.

In such an information processing device, before the preset condition is satisfied, repeated fusion makes it possible to enhance the first game content in a stepwise manner, and, once the preset condition is satisfied, repeated fusion makes it possible to newly enhance said other game content obtained after making the changes. For this reason, it is possible to increase the player's motivation to repeat game content fusion before and after the preset condition is satisfied. Moreover, once the preset condition is satisfied, the other game content obtained after making the changes can be dramatically enhanced using the provided item.

In addition, this information processing device may be adapted such that upon receipt of operation input from the player, the benefit provision processing unit initializes parameters configured in said first game content while providing items capable of increasing the parameters configured in said first game content, or alternatively initializes parameters configured in said first game content while providing items capable of increasing the initialized parameters configured in said first game content.

In such an information processing device, once the preset condition is satisfied, the player, by performing input operations at any time, can enhance the initialized first game content and the other game content obtained after making the changes and, in addition, can acquire items.

Further, this information processing device may be adapted such that the preset condition is that the frequency of fusion, at which the first game content and the second game content have been fused, has reached a predetermined frequency, or that the upper limits of the parameters configured in the first game content have reached a cap value.

In such an information processing device, imposing restrictions on the frequency of fusion and the upper limits of the parameters allows for control to be exercised such that the parameters configured in the first game content are not subject to excessive variation.

In addition, this information processing device may be adapted such that the benefit provision processing unit provides inherent items associated with the first game content.

In such an information processing device, the player's motivation to repeat game content fusion can be further increased because the player will repeatedly perform game content fusion with a view to collect the inherent items for each piece of game content.

In addition, this information processing device may be adapted such that the benefit provision processing unit provides different benefits depending on the class of rarity configured in the first game content.

In such an information processing device, the benefits provided to the player are different depending on the rarity of the first game content, and, therefore, the player can be continuously motivated to repeatedly fuse game content.

Further, the invention is a game program (e.g., computer readable medium containing instructions) characterized by directing a computer to carry out: determination processing, during which it is determined whether or not a preset condition related to fusing a basic first game content and a second game content used as source material for fusion has been satisfied; fusion processing during which, before the preset condition is satisfied, the upper limits of parameters configured in said first game content are varied in a stepwise manner by fusing the second game content with the first game content; and benefit provision processing during which, once the preset condition is satisfied, the parameters configured in said first game content are initialized and, at the same time, items capable of increasing at least the initialized parameters configured in said first game content are provided.

In such a game program, the player's motivation to repeat game content fusion can be increased.

Further, the invention is a game program (e.g., computer readable medium containing instructions) characterized by directing a computer to carry out: determination processing, during which it is determined whether or not a preset condition related to fusing a basic first game content and a second game content used as source material for fusion has been satisfied; fusion processing during which, before the preset condition is satisfied, the upper limits of parameters configured in said first game content are varied in a stepwise manner by fusing the second game content with the first game content; and benefit provision processing during which, once the preset condition is satisfied, said first game content is changed into other game content and, at the same time, items capable of increasing at least the parameters configured in said other game content are provided.

In such a game program, the player's motivation to repeat game content fusion can be increased.

—Embodiments—

<<Configuration of Game System 1>>

FIG. 1 is a diagram showing an example configuration of the entire game system 1 according to the present embodiment. The game system 1 provides various game-related services to the player over a network 2 (for example, the Internet) and includes a server device 10 and multiple player terminals 20.

<Configuration of Server Device 10>

Figure 2:
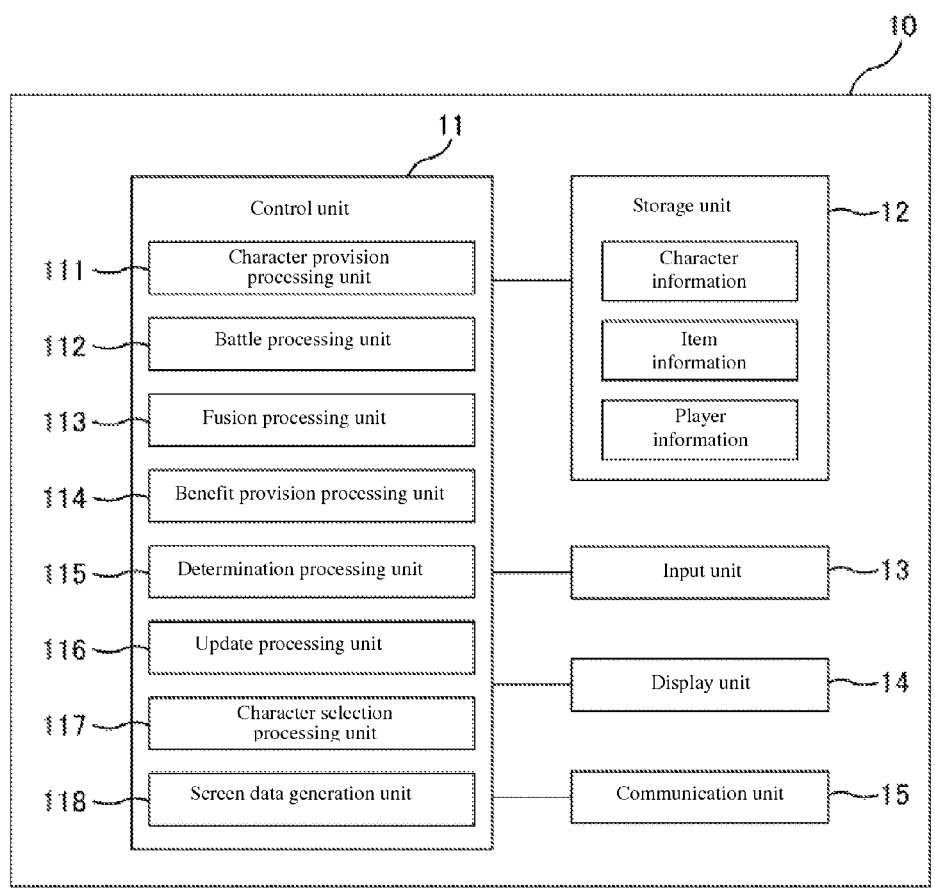
[FIG. 2] A block diagram showing the functional configuration of the server device 10.

FIG. 2 is a block diagram showing the functional configuration of the server device 10 according to the present embodiment. When the server device 10, which is an information processing device (for example, a workstation, a personal computer, etc.) used by a system administrator, or the like, to operate and manage gaming services, receives various types of commands (requests) from the player terminals 20, it can distribute (respond with) game programs operational on the player terminals 20 and web pages (game screens, etc.) created in a markup language (HTML, etc.) adapted to the specifications of the player terminals 20. This server device 10 has a control unit 11, a storage unit 12, an input unit 13, a display unit 14, and a communication unit 15.

Along with transferring data between the components, the control unit 11 exercises overall control over the server device 10 and is implemented by a CPU (Central Processing Unit) running a predetermined program stored in memory. The control unit 11 of the present embodiment is furnished with a character provision processing unit 111, a battle processing unit 112, a fusion processing unit 113, a benefit provision processing unit 114, a determination processing unit 115, an update processing unit 116, a character selection processing unit 117, and a screen data generation unit 118.

The character provision processing unit 111, which is an example of a game content provision processing unit, possesses functionality to carry out processing during which characters, which constitute an example of game content, are provided to players. The game content is represented by electronic game data, for example, characters, as well as game cards and figures with which the characters etc. are associated, or items such as tools, abilities, or the like used in the game.

The battle processing unit 112 possesses functionality to carry out various types of battle game-related processing. The battle processing unit 112 according to the present embodiment carries out processing to decide the winner of a battle between a player character and an enemy character.

The fusion processing unit 113 possesses functionality to carry out various types of processing related to game content fusion. The fusion of game content consists in fusing game content used as source material for fusion (hereinafter referred to as "source material content") with basic game content (hereinafter referred to as "base content"), thereby placing the fused basic game content in the player's possession without allowing the player to acquire the game content used as source material for fusion. The fusion processing unit 113 according to the present embodiment has a parameter variation processing unit that varies parameters configured in the game content. For example, the parameter variation processing unit according to the present embodiment increases the values of the parameters configured in the base content up to an upper limit or increases the upper limits of these parameters.

The benefit provision processing unit 114 possesses functionality to carry out processing used to provide a benefit to the player. The benefit consists in providing a game service advantageous to the player, for example, providing a game item to the player. Along with initializing the parameters configured in the base content, the benefit provision processing unit 114 according to the present embodiment provides the player with items capable of increasing the initialized parameters configured in said base content.

The determination processing unit 115 possesses functionality to carry out various types of determination processing. For example, the determination processing unit 115 according to the present embodiment determines whether a preset condition related to fusing the base content and the source material content has been satisfied. For example, this preset condition is that the frequency of fusion of the base content with the source material content has reached a predetermined frequency.

The update processing unit 116 possesses functionality to carry out processing used to update various types of information stored in the storage unit 12. For example, the update processing unit 116 according to the present embodiment updates the records of player information stored in the storage unit 12 depending on whether the player still owns or no longer owns the game content.

The character selection processing unit 117, which is an example of a game content selection processing unit, possesses functionality to carry out processing used to select an arbitrary character from among multiple characters. For example, the character selection processing unit 117 according to the present embodiment selects a character, in which the upper limits of the parameters have reached a cap value, from among the multiple characters in the player's possession.

The screen data generation unit 118 possesses functionality to carry out processing used to generate screen data for displaying a game screen on a player terminal 20. The screen data generation unit 118 of the present embodiment generates HTML data as screen data corresponding to a game screen.

The storage unit 12 has a ROM (Read Only Memory), which is a read-only storage area where operating system software is stored, and a RAM (Random Access Memory), which is a rewritable storage area used as a work area for arithmetic processing by the control unit 11, and is implemented as a non-volatile storage device, such as a flash memory, a hard disk, or the like. The storage unit 12 of the present embodiment stores at least character information, i.e. character-related information, item information, i.e. item-related information, and player information, i.e. player-related information. It should be noted that each of these information elements will be described in more detail below.

The input unit 13, which is used by a system administrator etc. to enter various types of data (e.g., character information, etc.), is implemented, for example, as a keyboard, a mouse, or the like.

The display unit 14, which is used to display an operation screen for a system administrator in response to a command from the control unit 11, is implemented, for example, as a liquid crystal display (LCD: Liquid Crystal Display), or the like.

The communication unit 15, which is used for communication with the player terminals 20, has receiver functionality for receiving various types of data and signals transmitted from the player terminals 20 and transmitter functionality for transmitting various types of data and signals to the player terminals 20 in response to a command from the control unit 11. The communication unit 15 is implemented, for example, as an NIC (Network Interface Card), or the like.

<Configuration of Player Terminal 20>

Figure 3:
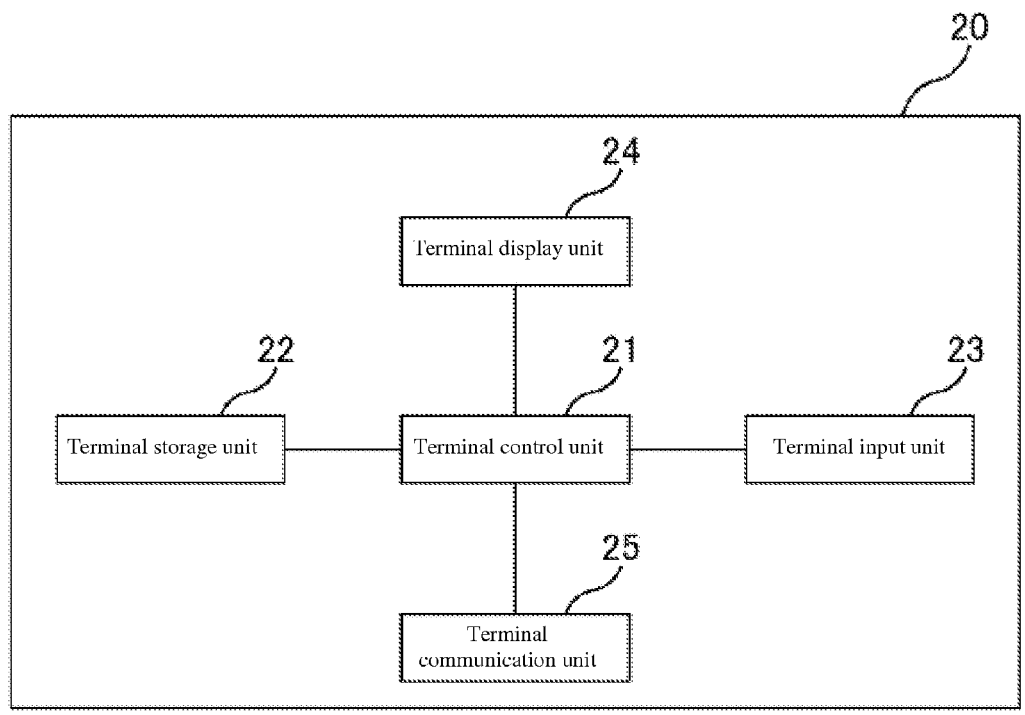
[FIG. 3] A block diagram showing the functional configuration of the player terminal 20.

FIG. 3 is a block diagram showing the functional configuration of a player terminal 20. The player terminal 20 of the present embodiment, which is an information processing device the player uses during game play (e.g., a mobile phone terminal, a smart phone, a tablet type terminal, etc.), can transmit delivery requests regarding various types of game-related information (game programs, web pages, etc.) to the server device 10. Since the player terminal 20 has web browser functionality for allowing the player to view web pages, it can display web pages delivered by the server device 10 (game screens, etc.). This player terminal 20 has a terminal control unit 21, a terminal storage unit 22, a terminal input unit 23, a terminal display unit 24, and a terminal communication unit 25.

The terminal control unit 21, along with transferring data between the components, exercises overall control over the player terminal 20 and is implemented using a CPU (Central Processing Unit) that runs a predetermined program stored in memory. It should be noted that the terminal control unit 21 of the present embodiment also operates as a screen view control unit controlling the display of the game screens shown on the terminal display unit 24. The terminal storage unit 22, which is connected to the terminal control unit 21 across a bus, carries out processing for looking up, reading out, and re-writing stored data in response to commands from the terminal control unit 21. This terminal storage unit 22 is implemented, for example, as a flash memory, a hard disk, or the like. The terminal input unit 23, which is used by the player to perform various operations (game operations, etc.), is implemented, for example, in the form of control buttons, a touch panel, or the like. The terminal display unit 24, which is used to display a game screen in response to a command from the terminal control unit 21, is implemented, for example, in the form a liquid crystal display (LCD: Liquid Crystal Display) or the like. The terminal communication unit 25, which operates as a transceiver unit for transmitting and receiving various types of information to and from the server device 10 over a network 2, is implemented, for example, as an NIC (Network Interface Card) or the like.

<Data Structure>

FIG. 4 is a diagram showing an example data structure of the character information stored in the storage unit 12 of the server device 10. This character information has elements (fields) such as Character ID, Character Name, Character Image, Rarity, Item ID, Initial Attack Power, Initial Defense Power, Initial Physical Strength, Initial Upper Attack Power Limit, Initial Upper Defense Power Limit, Initial Upper Physical Strength Limit, $2^{nd}$ Upper Attack Power Limit, $2^{nd}$ Upper Defense Power Limit, $2^{nd}$ Upper Physical Strength Limit, $3^{rd}$ Upper Attack Power Limit, $3^{rd}$ Upper Defense Power Limit, and $3^{rd}$ Upper Physical Strength Limit. Character ID represents identification information identifying a character. Character Name represents information indicating the display name of the character. Character Image represents image data for the character. Rarity represents information indicating scarcity classified into multiple classes depending on the scarcity value of the character. In the present embodiment, Rarity configured in a character is classified into 4 tiered classes ("Common">"Uncommon">"Rare">"Superrare"). Item ID represents identification information identifying inherent items configured in this character. If a character renewal, to be described later, has been performed on the character, an associated inherent item is provided to this character. Initial Attack Power, Initial Defense Power, and Initial Physical Strength are parameters (capability values) related to the capabilities initially configured in the character. Initial Upper Attack Power Limit, Initial Upper Defense Power Limit, and Initial Upper Physical Strength Limit are upper limit values configured initially (in Tier 1) in the capability parameters of the character. $2^{nd}$ Upper Attack Power Limit, $2^{nd}$ Upper Defense Power Limit, and $2^{nd}$ Upper Physical Strength Limit are upper limit values configured in Tier 2 in the capability parameters of the character. $3^{rd}$ Upper Attack Power Limit, $3^{rd}$ Upper Defense Power Limit, and $3^{rd}$ Upper Physical Strength Limit are upper limit values (cap values) configured in Tier 3 in the capability parameters of the character. In this manner, in the present embodiment, there are three upper limit values configured in a stepwise manner for the capability parameters of the character.

FIG. 5 is a diagram showing an example data structure of the item information stored in the storage unit 12 of the server device 10. This item information has Item ID, Item Name, Parameter Increment, and other elements. Item ID represents identification information identifying an item. Item Name represents information indicating the display name of an item. Parameter Increment represents information indicating the amount of points added to the current value of a parameter configured in the character as a result of using an item.

FIG. 6 is a diagram showing an example data structure of the player information stored in the storage unit 12 of the server device 10. This player information has elements such as Player ID, Virtual Medals, Automatic Fusion Configuration, Proprietary Character Information, and Proprietary Item Information. Player ID represents identification information identifying a player. Virtual Medals represents information indicating the amount of virtual medals, as an example of the game values that the player has. In the course of the game, the player can acquire virtual medals and can increase the parameters (current values) of a proprietary character or purchase items using these virtual medals. Automatic Fusion Configuration represents information indicating the configuration status of automatic fusion used to automatically perform character fusion. If, as a result of the player's operations, the automatic fusion configuration is set to ON, then automatic character fusion is enabled, and if it is set to OFF, then automatic character fusion is disabled. Proprietary Character Information represents information that indicates characters belonging to a player (hereinafter referred to as "proprietary characters"). Proprietary Item Information represents information that indicates game items belonging to a player (hereinafter referred to as "proprietary items").

FIG. 7 is a diagram showing an example data structure of the proprietary character information. This proprietary character information has elements such as Character ID, Item ID, Attack Power, Defense Power, Physical Strength, Upper Attack Power Limit, Upper Defense Power Limit, Upper Physical Strength Limit, and Frequency of Fusion. Character ID represents identification information identifying a proprietary character. Item ID represents identification information identifying a proprietary item (equipment items) assigned to this proprietary character. The player can increase the parameters (Attack Power, Defense Power, and Physical Strength) of a proprietary character by assigning a proprietary item to the proprietary character. The Attack Power, Defense Power, and Physical Strength of a proprietary character are parameter values configured in the proprietary character at the present time (current values). It should be noted that if a proprietary character has proprietary items assigned thereto, these are incremented parameter values (current values). The Upper Attack Power Limit, Upper Defense Power Limit, and Upper Physical Strength Limit of the character represent information indicating the current upper limit values of the parameters configured in the proprietary character. These various parameters are updated as the game progresses. The frequency of fusion represents information indicating the number of times character fusion has been performed.

Figures 8, 9:
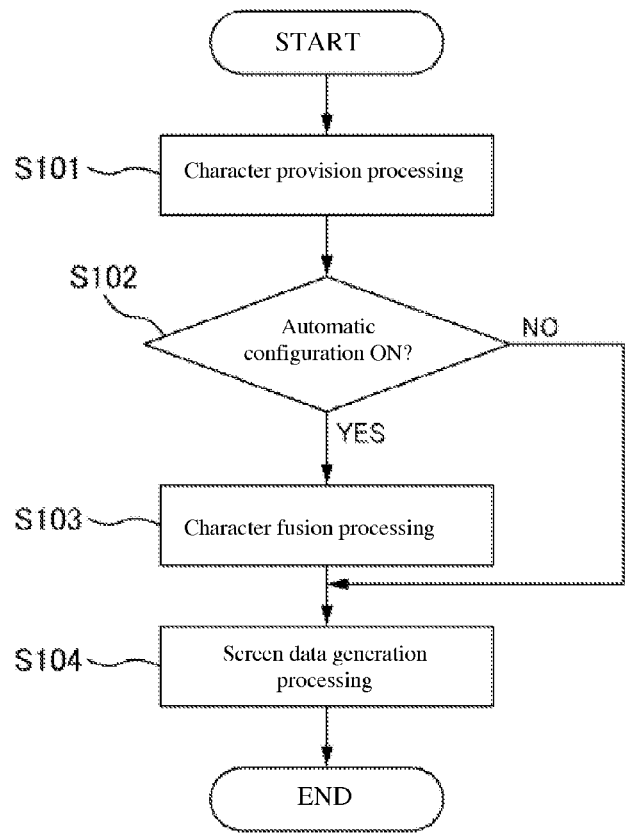
[FIG. 8] A diagram showing an example data structure of proprietary item information.
[FIG. 9] A flow chart used to illustrate an example of operation related to character fusion.

FIG. 8 is a diagram showing an example data structure of the proprietary item information. This proprietary item information has elements such as Item ID and Number Owned. Item ID represents identification information identifying the various items the player owns. Number Owned represents information indicating the quantity of the items the player owns.

<<Game Overview>>

An overview of the game provided by the game system 1 of the present embodiment is provided below. In this game system 1, various games are provided using electronic game cards having game characters associated therewith (virtual cards used in the game; referred also to simply as "characters" below).

<Battle Games>

In the game system 1 of the present embodiment, a player can own multiple characters. A player can conduct a battle game using the player characters in his or her possession. Specifically, the battle processing unit 112 decides on the enemy character to be used as the player's opponent and decides the winner of a battle between these two characters based on various parameters configured in the player character and enemy character (Attack Power, Defense Power, Physical Strength, etc.). If the player wins the battle with the enemy character, the items that belong to the enemy character, as well as the enemy character itself, are awarded to the player.

<Lottery Games>

In the game system 1 according to the present embodiment, the player can conduct lottery games called "Gacha games" (registered trademark). In the lottery games, a character selected from among multiple characters is provided to the player. The lottery games include ordinary lottery games and special lottery games. In an ordinary lottery game, a single character is provided to the player when a single lottery drawing is conducted. In contrast, in a special lottery game, multiple characters are provided to the player at once when a single lottery drawing is conducted. The player can selectively conduct either ordinary lottery games or special lottery games. By repeatedly conducting such lottery games, the player can increase the number of characters in his or her possession until a maximum number is reached. The player can then conduct the above-described battle game using the characters in his or her possession.

<Character Fusion>

In the game system 1 of the present embodiment, the player can perform character fusion by combining a character used as source material for fusion (hereinafter referred to as "source material character") with a basic character selected from among the multiple characters in his or her possession (hereinafter referred to as "base character").

In the discussion below, it is assumed that the preset condition related to character fusion is that the number of times character fusion has been performed (frequency of fusion) has reached a predetermined frequency.

If the base character and the source material character are the same characters before the frequency of fusion reaches the predetermined frequency, fusing this source material character with the base character causes the upper limit value of the parameters configured in the base character before fusion to increase and be reconfigured in the fused base character such that the values of these parameters can rise above the upper limit. If character fusion is performed in this manner, then the player cannot own both the base character and the source material character and can only own the base character obtained after being enhanced by fusion.

In addition, if character fusion is repeated until the frequency of fusion reaches the predetermined frequency, the upper limit values of the parameters configured in the base character increase in a stepwise manner. In the present embodiment, as shown in the character information of FIG. 4, the frequency of fusion is restricted to 3 times, and therefore, if character fusion is repeated 3 times, the upper limit of the parameters configured in the base character reach a cap value, such that even if character fusion is repeated, it becomes impossible to increase the upper limit values of the parameters configured in the base character.

It should be noted that, once the frequency of fusion reaches the predetermined frequency, if the base character and the source material character are the same characters, then whenever this source material character is fused with the base character, the upper limit value (cap value) of the parameters configured in the base character before fusion cannot be further increased, but the items based on the properties configured in this source material character are provided to the player. If character fusion is performed in this manner, then the player cannot own the source material character and can continue to own only the base character. At the same time, the player can acquire items based on the properties of the source material character. Since in the present embodiment, as described above, the frequency of fusion is restricted to 3 times, whenever character fusion is repeated a fourth, fifth, sixth, . . . time, there is no more variation in the upper limit values (cap values) of the parameters configured in the base character, but the items based on the properties of the source material character are provided to the player. The type of items based on the properties of the source material character differs depending on the class of rarity configured in the source material character.

<Character Renewal>

In the game system 1 of the present embodiment, once the preset condition related to character fusion is satisfied, the player, by carrying out predetermined input operations at any time, can perform a character renewal on the base character in a state wherein the upper limits of its parameters have reached a cap value (called "fully evolved base character" below). Character Renewal refers to game processing used to provide benefits to players who own fully evolved base characters.

In the discussion below, it is assumed that, in the same manner as in the case of the above-described character fusion, the preset condition related to character fusion is that the number of times character fusion has been performed (frequency of fusion) has reached a predetermined frequency.

Once the frequency of fusion reaches the predetermined frequency, character renewal is carried out if the player performs predetermined input operations, as a result of which the parameters configured in the fully evolved base character are initialized while items capable of increasing the initialized parameters configured in said base character are provided to the player.

It should be noted that the upper limit values of the initialized parameters can again be increased in a stepwise manner by repeatedly performing the above-described character fusion on the base character having these initialized parameters configured therein.

In this manner, before the frequency of fusion reaches the predetermined frequency, the base character can be enhanced in a stepwise manner by repeatedly performing fusion, and, once the frequency of fusion reaches the predetermined frequency, the initialized base character can again be continuously enhanced by repeatedly performing fusion. In other words, even though as a result of repeatedly performing character fusion the upper limits of the parameters configured in the base character reach a cap value and increasing the upper limit of this parameters above the cap value becomes impossible, the parameters configured in this base character can be reverted to the initial values by performing a character renewal. For this reason, once a character renewal is performed, the upper limits of the parameters configured in the base character can be increased in a stepwise manner by repeating character fusion again. By doing so, the player's motivation to repeat character fusion can be increased.

In addition, once a character renewal has been performed, the initialized parameters can be dramatically increased using the item provided as a result of character renewal, and therefore it becomes advantageous for the player to enhance the base character and the player's motivation to repeat character fusion can be further increased.

<Automatic Fusion>

In the game system 1 of the present embodiment, predetermined operations performed by the player enable automatic character fusion regardless of the player's operations when a character is provided to the player in a battle game or a lottery game. For this reason, as soon as the character is provided, upon determining whether or not this character is a source material character that can be fused with the base character, character fusion is carried out automatically. For this reason, it becomes possible to reduce the time and effort required for operation input by the player.

<<Operation of Game System 1>>

In the game system 1 according to the present embodiment, the control unit 11 in the server device 10 executes the various types of processing discussed below by controlling each functional unit under its control based on a game program stored in the storage unit 12.

<Operation Related to Character Fusion>

FIG. 9 is a flow chart used to illustrate an example of operation related to character fusion in the present embodiment.

When the player performs an operation to initiate a lottery game, the player terminal 20 transmits a lottery game initiation request to the server device 10. When the server device 10 receives the lottery game initiation request transmitted from the player terminal 20, it carries out character provision processing (S101). Specifically, based on the character information shown in FIG. 4, the character provision processing unit 111 provides the player with a character selected from among multiple characters.

Next, when the character is provided to the player, the server device 10 determines whether or not character fusion has been set to automatic fusion (S102). Namely, by referring to the player information shown in FIG. 6, the determination processing unit 115 determines whether or not automatic fusion has been set to ON.

It should be noted that character fusion may be set to always perform automatic fusion without requiring the player to perform automatic fusion configuration in advance and having to perform determination processing in Step 102.

If as a result of such determination it is determined that automatic fusion is set to OFF (S102: NO), the routine advances to Step 104 and screen data generation processing is carried out. In other words, the screen data generation processing unit 118 generates screen data corresponding to a game screen including characters provided to the player.

On the other hand, if it is determined that automatic fusion is set to ON (S102: YES), the routine advances to Step 103 and character fusion processing is carried out. The character fusion processing is used to execute the various types of processing shown below.

First of all, the server device 10 carries out processing to determine whether or not it is possible to fuse the source material character with the base character. In other words, the determination processing unit 115 determines whether or not the character provided to the player (source material character) is a character identical to the base character specified by the player. In the present embodiment, the determination as to whether the character is identical to the base character is carried out based on whether or not there is a match between the Character IDs.

If as a result of such determination it is determined that the character is not identical to the base character, update processing is carried out. Namely, the update processing unit 116 updates the proprietary character information shown in FIG. 7 by recording the character provided to the player as a proprietary character of the player in the storage unit 12.

On the other hand, if it is determined that the character is identical to the base character, then a determination is made as to whether or not a preset condition related to character fusion has been satisfied. Namely, by referring to the proprietary character information shown in FIG. 7, the determination processing unit 115 determines whether or not the frequency of fusion of the base character specified by the player has reached a maximum frequency (in the present embodiment, 3 times).

If as a result of such determination it is determined that the frequency of fusion of the base character has not reached the maximum frequency, parameter variation processing is carried out. Specifically, based on the character information shown in FIG. 4 and the proprietary character information shown in FIG. 7, the fusion processing unit 113 (parameter variation processing unit) increases the upper limit values of the capability parameters configured in the base character from the current tier to the next tier. At such time, the fusion processing unit 113 can also increase the current values of the capability parameters configured in the base character. Subsequently, the update processing unit 116 updates the proprietary character information shown in FIG. 7 by resetting new current upper limit values for the capability parameters configured in the base character without turning the character provided to the player into a proprietary character of the player.

On the other hand, if it is determined that the frequency of fusion of the base character has reached the maximum frequency, the fusion processing unit 113 provides the player with items based on the properties configured in the character provided to the player without varying the capability parameters configured in the base character. Subsequently, the update processing unit 116 updates the proprietary item information shown in FIG. 8 by recording the items provided to the player as the player's proprietary items in the storage unit 12 without turning the character provided to the player into a proprietary character of the player.

Next, going back to FIG. 9, when the character fusion processing is thus finished, the server device 10 carries out screen data generation processing (S104). Namely, the screen data generation unit 118 generates screen data (HTML data) corresponding to a game screen related to the lottery game.

The server device 10 then transmits the thus generated screen data to the requesting player terminal 20 over a network. When this screen data transmitted from the server device 10 is received, the player terminal 20 analyzes the screen data and directs the terminal display unit 24 to display a game screen (web page).

<Operation Related to Character Renewal>

Figure 10:
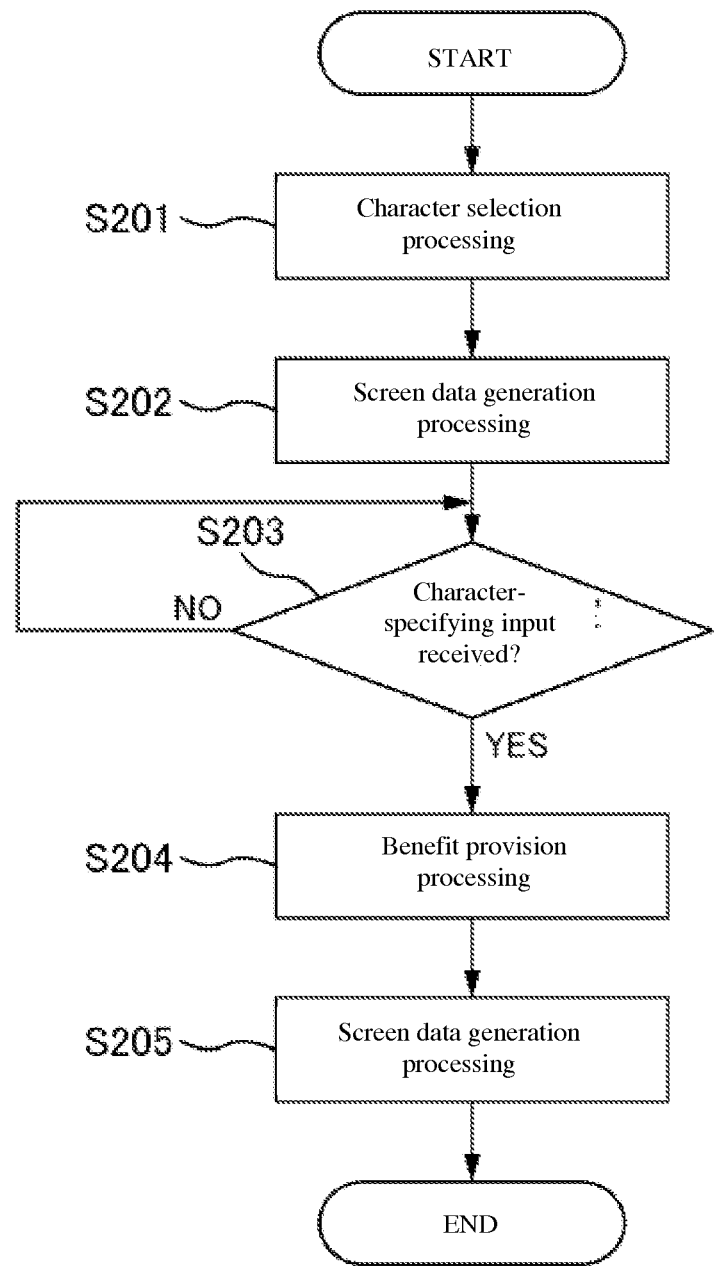
[FIG. 10] A flow chart used to illustrate an example of operation related to character renewal.

FIG. 10 is a flow chart used to illustrate an example of operation related to character renewal in the present embodiment.

When the player performs an operation to initiate a character renewal, the player terminal 20 transmits a game initiation page transmission request to the server device 10. When the server device 10 receives the game initiation page transmission request transmitted from the player terminal 20, it carries out character selection processing (S201). Specifically, a character (namely, a fully evolved base character), in which the upper limit values of the capability parameters have reached the upper limit values (cap values) configured in Tier 3, is selected from among the player's proprietary characters by the character selection processing unit 117 based on the character information shown in FIG. 4 and the proprietary character information shown in FIG. 7.

Next, when the character selection processing is finished, the server device 10 carries out screen data generation processing (S202). Namely, the screen data generation unit 118 generates screen data (HTML data) corresponding to a start screen used for character renewal. This start screen used for character renewal includes images etc. of the selected fully evolved base character.

The server device 10 then transmits the generated screen data to the requesting player terminal 20 over a network. When this screen data transmitted from the server device 10 is received, the player terminal 20 analyzes the screen data and directs the terminal display unit 24 to display the start screen (web page) used for character renewal.

Next, when the player performs an operation to specify the fully evolved base character while this start screen used for character renewal is displayed on the terminal display unit 24, the player terminal 20 transmits a character renewal initiation request to the server device 10 along with the operation information. Upon receiving the initiation request transmitted from the player terminal 20, the server device 10, based on the player operation information, determines whether or not the fully evolved base character has been specified (S203).

Next, upon receiving operation input specifying the fully evolved base character in this manner, the server device 10 carries out character renewal processing, which is as an example of benefit provision processing (S204). Below, an example of operation related to character renewal processing will be illustrated in specific detail.

Figure 11:
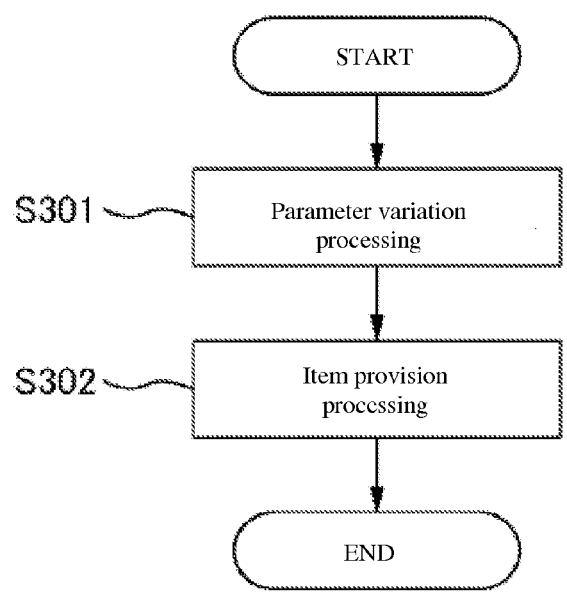
[FIG. 11] A flow chart used to illustrate character renewal processing.

FIG. 11 is a flow chart used to illustrate character renewal processing.

First of all, the server device 10 carries out parameter variation processing, which consists in varying the parameters configured in the fully evolved base character (S301). Specifically, based on the character information shown in FIG. 4 and the proprietary character information shown in FIG. 7, the benefit provision processing unit 114 carries out processing (initialization processing) to revert the current values of the parameters configured in the fully evolved base character (these current values are identical to the cap values) to the initial values. After that, the update processing unit 116 updates the proprietary character information shown in FIG. 7 by resetting the new current values (these current values are identical to the initial values) in the initialized base character.

Next, when the parameter variation processing is finished, the server device 10 carries out item provision processing, which is used to provide items to the player who has the initialized base character (S302). Specifically, based on the character information shown in FIG. 4, the benefit provision processing unit 114 provides the player with inherent items (equipment items) associated with this base character. After that, the update processing unit 116 updates the proprietary item information shown in FIG. 8 by recording the items provided to the player in the storage unit 12 as the player's proprietary items.

It should be noted that during such item provision processing the type of the benefits provided may be made different depending on the attributes configured in the base character. For example, when the Rarity (attribute) of the base character is "Rare" or higher, the benefit provision processing unit 114 may provide the player with items (equipment items), and when the Rarity of the base character is "Uncommon" or lower, it may provide the player with virtual medals (in-game currency).

Here, if the player applies the provided item to the initialized base character, the provided item is incorporated into the initialized base character, and, at the same time, the increment of the parameter associated with the item (see FIG. 5) is added to the current value of the parameter of the initialized base character. At the same time, the proprietary character information shown in FIG. 7 is updated by the update processing unit 116.

It should be noted that the player can incorporate the provided items into another proprietary character, and not only the initialized base character.

Next, going back to FIG. 10, when the character renewal processing is thus finished, the server device 10 carries out screen data generation processing (S205). Namely, the screen data generation unit 118 generates screen data (HTML data) corresponding to a game screen related to the lottery game.

The server device 10 then transmits the thus generated screen data to the requesting player terminal 20 over a network. When this screen data transmitted from the server device 10 is received, the player terminal 20 analyzes the screen data and directs the terminal display unit 24 to display a game screen (web page).

Figure 12:
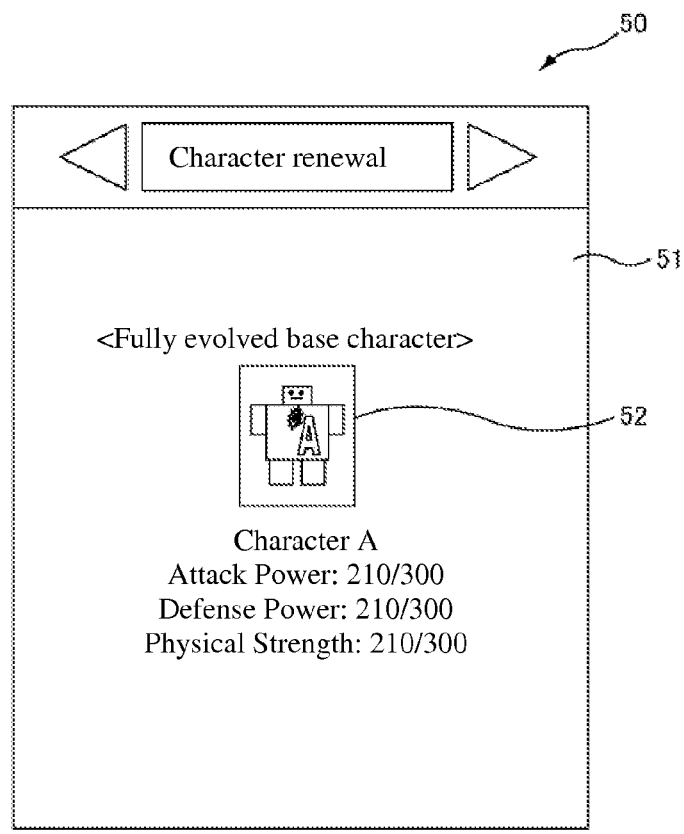
[FIG. 12] A diagram showing an example of the game screen 50 prior to character renewal.

FIG. 12 is a diagram showing an example of the game screen 50 prior to character renewal. A game field area 51 and a fully evolved base character 52 specified by the player are displayed on this game screen 50. Along with the fully evolved base character 52, the game field area 51 shows character information displayed in association with this base character 52. Here, "Character A" is specified by the player as the fully evolved base character 52 and Attack Power, Defense Power, and Physical Strength are shown as the capability parameters of "Character A". For each parameter, it is shown that the upper limit value (cap value) is "300" points and the current value is "210" points.

Figure 13:
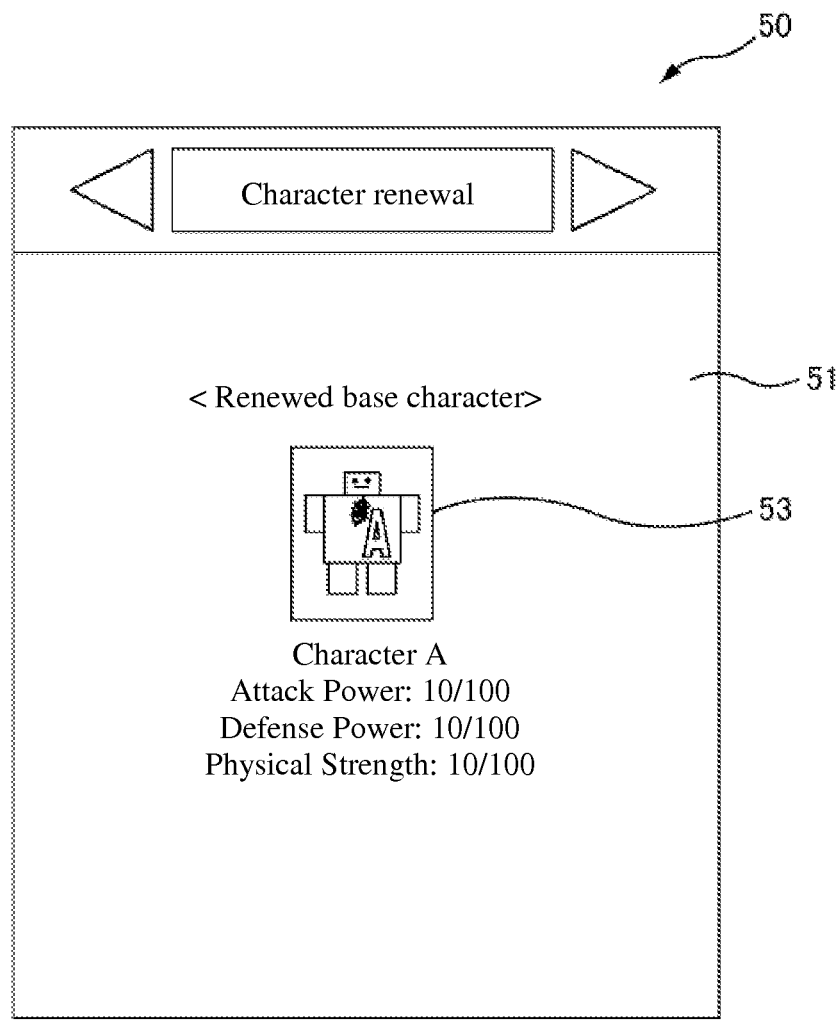
[FIG. 13] A diagram showing an example of the game screen 50 after character renewal.

FIG. 13 is a diagram showing an example of the game screen 50 after character renewal. Along with "Character A", i.e. the renewed base character 53, the game field area 51 shows character information displayed in association with this base character 53. Here, Attack Power, Defense Power, and Physical Strength are shown as the capability parameters of "Character A". For each parameter, it is shown that the upper limit value has dropped to "100" points and the current value has dropped to "10" points. In other words, this shows that character renewal results in parameter initialization and that upper limit values and current values of the capability parameters configured in the base character are reverted to the initial values.

Figure 14:
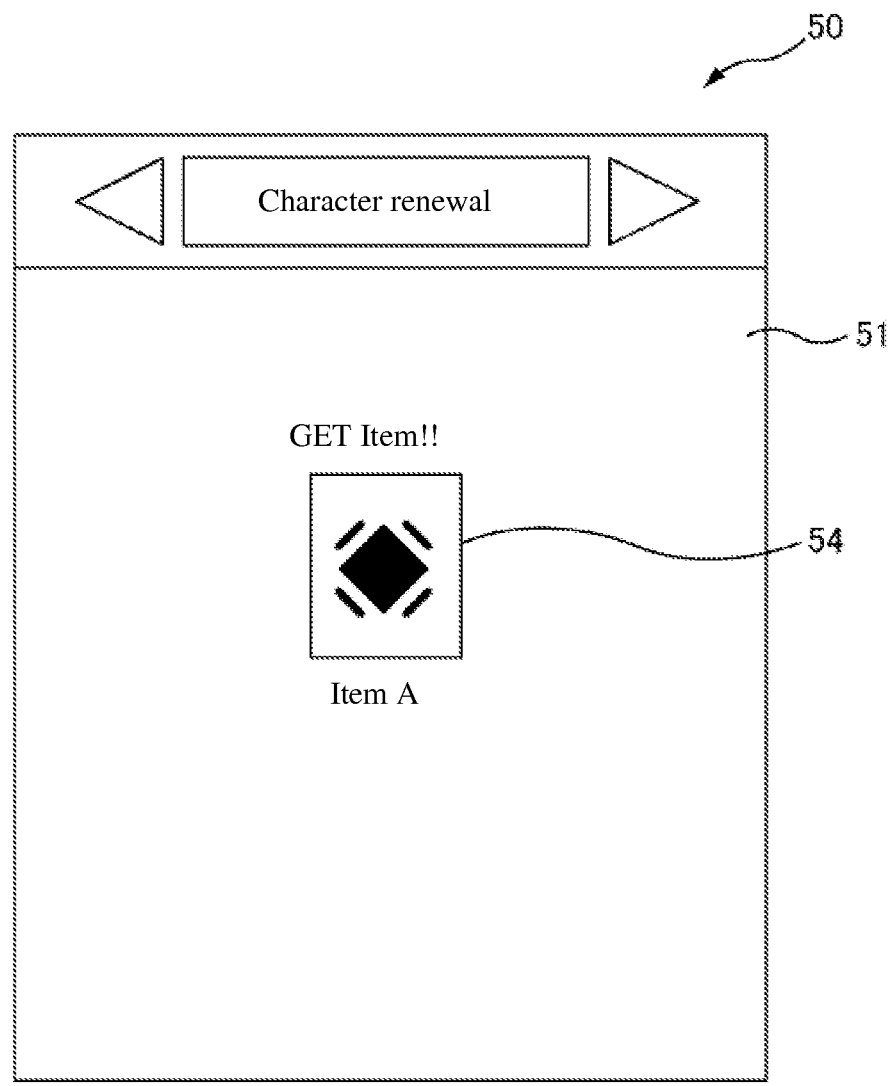
[FIG. 14] A diagram showing an example of the game screen 50 after item provision.

FIG. 14 is a diagram showing an example of the game screen 50 after providing an item. Here, "Item A", i.e. game item 54 provided to the player, is displayed in the game field area 51. The player can quickly enhance the initialized base character using the item.

As described above, in the game system 1 of the present embodiment, the base character can be enhanced in a stepwise manner by repeating character fusion before the preset condition related to character fusion is satisfied. On the other hand, once the preset condition related to character fusion is satisfied, the upper limit values of the parameters configured in the base character cannot be further increased. However, performing a character renewal based on operation input by the player makes it possible to revert the parameters configured in the base character to the initial values. Then, once a character renewal is performed, the upper limits of the parameters configured in the base character can be increased in a stepwise manner by repeating character fusion again. For this reason, the player's motivation to repeat character fusion can be increased. Furthermore, an item is provided to the player as a result of performing the character renewal. And, once a character renewal has been performed, using the item makes it possible to dramatically enhance the initialized base character.

In addition, the provision of inherent items for each character during character renewal makes it possible to increase the player's motivation to repeat game content fusion in order to collect items of various kinds.

—Other Embodiments—

The embodiments described above are intended to facilitate the understanding of the present invention and are not to be construed as limiting of the present invention. The present invention may be modified and improved without departing from the spirit thereof, and the present invention also includes equivalents thereto. In particular, the embodiments described below are also included in the present invention.

<Character Renewal>

Figure 15:
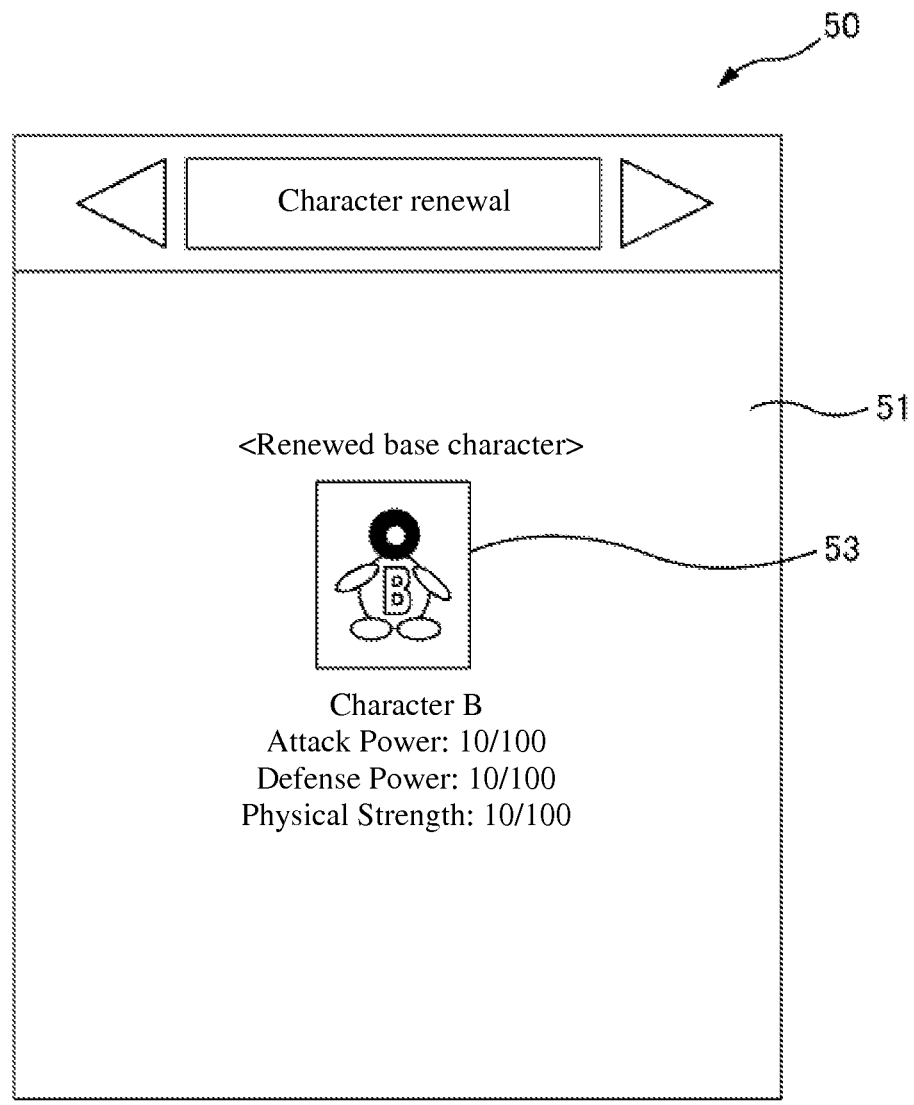
[FIG. 15] A diagram showing another example of the game screen 50 after character renewal.

In the embodiments described above, the explanations are given with reference to a case in which carrying out character renewal processing (benefit provision processing) initializes parameters configured in a fully evolved base character and, at the same time, items capable of increasing the initialized parameters configured in said base character are provided to the player. The present invention, however, is not limited thereto. For example, the benefit provision processing unit 114, by referring to the character information shown in FIG. 4, changes the Character ID corresponding to the fully evolved base character into a different Character ID, thereby changing it into another character of a different type than the fully evolved base character and, at the same time, may provide an item capable of increasing the parameters configured in said other character. At such time, the benefit provision processing unit 114 may provide an inherent item corresponding to the base character. In such a case, as shown in FIG. 15, "Character B", i.e. a renewed base character 53, is displayed on the game screen 50 used after character renewal differently than on game screen 50 shown in FIG. 13. Based on the character information shown in FIG. 4, the parameters of this "Character B" are set such that the initial upper limit value is "100" points and the initial value is "10" points. For this reason, once a character renewal is performed, the upper limits of the parameters configured in this changed (exchanged) base character can be increased in a stepwise manner by repeating character fusion again. By doing so, the player's motivation to repeat character fusion can be increased. Furthermore, an item is provided to the player as a result of performing the character renewal. And, once a character renewal has been performed, using the item makes it possible to dramatically enhance the other character. It should be noted that the player can incorporate the provided item into another proprietary character, and not only into the changed base character (other character).

It should be noted that the cap values of the parameters configured in the changed base character (other character) may be configured such that they are greater than the cap values of the parameters configured in the base character before the changes. As a result, once a character renewal has been performed, it becomes possible to grow a base character that is stronger than before the character renewal by repeating the character fusion.

In the present embodiment as described above, the explanations are given with reference to a case in which the parameters configured in the fully evolved base character are initialized by carrying out parameter variation processing when a character renewal is performed. The present invention, however, is not limited thereto. For example, instead of reverting the current values of the parameters to the initial values, the current values of the parameters may be reduced by half or alternatively, the current values of the parameters may be uniformly reduced to a predetermined value (e.g., 0 points).

In the present embodiment as described above, the explanations are given with reference to a case in which a character renewal can be performed on a fully evolved base character. The present invention, however, is not limited thereto. For example, it may be possible to perform a character renewal not only when the upper limit values of the parameters configured in the base character reach the upper limit values (cap values) configured in Tier 3, but also when they reach the upper limit values configured in Tier 2. Namely, it may be possible to perform a character renewal at an intermediate level before the upper limits of the parameters reach the cap values.

In the present embodiment as described above, when the parameters configured in the fully evolved base character are initialized by performing a character renewal, the cap values of the parameters configured in the initialized base character may be reconfigured to be higher than the cap values of the parameters configured in the base character before initialization. As a result, once a character renewal has been performed, it becomes possible to grow a base character that is stronger than before the character renewal by repeating the character fusion.

In the present embodiment as described above, the explanations are given with reference to a case in which a character renewal can be performed by the player by performing predetermined input operations at any time. The present invention, however, is not limited thereto, and character renewal may be set up to be performed automatically. For example, the benefit provision processing unit 114 may be set up to automatically perform character renewal processing (benefit provision processing) when the determination processing unit 115 makes a determination as to whether a condition has been satisfied, the condition being that the upper limit values of the parameters configured in the base character reach the upper limit values (cap values) configured in Tier 3.

<Character Fusion>

In the present embodiment as described above, the explanations are given with reference to a case in which character fusion is carried out when the base character and the source material character are identical characters. The present invention, however, is not limited thereto. For example, the base character and the source material character may be characters belonging to the same group, or they may be different characters. As another example, character fusion may be performed when all the characters of many types pre-associated with the base character come into the player's possession.

In addition, in the present embodiment as described above, the explanations are given with reference to a case in which the upper limit values of the parameters configured in the base character are increased in a stepwise manner when the base character and a source material character are repeatedly fused before the preset condition related to character fusion is satisfied. The present invention, however, is not limited thereto. For example, the current values of the parameters configured in the base character may be increased in a stepwise manner in the range between the current values and the upper limit values.

In addition, in the present embodiment as described above, the explanations are given with reference to a case in which the player is provided with a single source material character and this single source material character is fused with the base character. The present invention, however, is not limited thereto. For example, it can also be applied to cases in which two or more source material characters are provided to the player at once and each source material character is fused with the base character in succession.

<Preset Conditions Related to Character Fusion>

In the present embodiment as described above, the explanations are given with reference to a case in which the preset condition related to character fusion is that the frequency of fusion reaches a predetermined frequency (e.g., maximum frequency: 3). The present invention, however, is not limited thereto. For example, the preset condition related to character fusion may be that the upper limit of the parameters configured in the base character reaches a cap value (maximum value) as character fusion is repeated in a configuration that has no limitations imposed on the frequency of fusion. In addition, the preset condition related to character fusion may be that the parameters (current values) of the base character reach the upper limits of the parameters configured in the base character. Alternatively, a combination of the above-described specific conditions may be used as the preset condition related to character fusion.

<Automatic Fusion>

In the present embodiment as described above, automatic fusion is also applicable to cases in which multiple characters are provided to the player at once as a result of conducting a special lottery game. At such time, one character among the multiple characters provided to the player may be used for automatic fusion as a base character and the remaining characters among the multiple characters may be used for automatic fusion as source material characters.

<Character Provision Processing>

In the present embodiment as described above, the explanations are given with reference to battle games and lottery games as examples of character provision processing. The present invention, however, is not limited thereto. For example, characters may be provided when a mission given to the player is completed. In addition, characters may be provided when the player enters a serial code displayed on a web page, etc. Further, characters may be provided when the player logs in to the game system 1. Furthermore, characters may be provided in response to events (event point spending, higher ranking) supplied in the game system 1.

<Specifying Base Character>

In the present embodiment as described above, the player may use a character specified by the player among the proprietary characters as a base character for fusion. In addition, a character automatically selected by the fusion processing unit 113 without any specifying input from the player may also be used as a base character for fusion.

<Server Device 10>

In the present embodiment as described above, the explanations are given with reference to a game system 1 equipped with a single server device 10 as an example of a service device. The invention, however, is not limited thereto and a game system 1 equipped with multiple server devices 10, as an example of server devices, may also be used. In other words, multiple server devices 10 may be connected over a network 2 and these server devices 10 may perform various types of processing in a distributed manner.

<Information Processing Device>

In the game system 1 used in the present embodiment as described above, the explanations are given with reference to a case in which various types of information processing are carried out by directing the server device 10 and the player terminals 20 to cooperate in accordance with a game program. The invention, however, is not limited thereto and the above-mentioned various types of information processing may be carried out based on the game program using the server device 10 alone or the player terminals 20 alone as information processing devices.

In addition, a configuration may be used, in which the player terminals 20 support part of the information processing device functionality. In such a case, the server device 10 and the player terminals 20 constitute an information processing device.

It should be noted that the information processing device is an example of a computer equipped with a processor and a memory.

DESCRIPTION OF THE REFERENCE NUMERALS

1 Game system, 2 Network, 10 Server device, 11 Control unit, 12 Storage unit, 13 Input unit, 14 Display unit, 15 Communication unit, 20 Player terminal, 21 Terminal control unit, 22 Terminal storage unit, 23 Terminal input unit, 24 Terminal display unit, 25 Terminal communication unit, 50 Game screen, 51 Game field area, 52 Base character, 53 Base character, 54 Game item, 111 Character provision processing unit, 112 Battle processing unit, 113 Fusion processing unit, 114 Benefit provision processing unit, 115 Determination processing unit, 116 Update processing unit, 117 Character selection processing unit, 118 Screen data generation unit

The invention claimed is:

1. An information processing device provided with:
a non-transitory memory device configured to store player information, in which game content owned by a player is configured in association with the player; and,
a processor, configured to:
initiate fusion processing for virtual cards, wherein the fusion processing comprises fusing two virtual cards associated with identical characters, each virtual card selected from a set consisting of virtual cards indicated in the game content as owned by the player;
determine whether or not a preset condition associated with fusing a first game content and a second game content used as source material for fusion has been satisfied, the first game content being a first virtual card from the game content owned by the player, the second game content being a second virtual card from the game content owned by the player, the second virtual card being a source material card for a character fusion operation, the first virtual card associated with upper limits of parameters;
before the preset condition is satisfied, utilize fusion processing to fuse the second game content with the first game content to thereby vary upper limits of parameters configured in said first game content in a stepwise manner;
subsequent to the fusion processing, update the player information such that said first game content having the varied parameters configured therein is placed in the player's possession while said second game content is not placed in the player's possession; and
wherein once the preset condition is satisfied, initialize the varied parameters configured in said first game content and, at the same time, provide items capable of increasing at least the initialized varied parameters configured in said first game content.

2. The information processing device according to claim 1, wherein the processor, upon receiving an operation input from the player, is configured to initialize the parameters configured in said first game content and, at the same time, and provides items capable of increasing the initialized varied parameters configured in said first game content.

3. The information processing device according to claim 1, wherein the preset condition is a frequency of fusion, at which the first game content and the second game content have been fused, has reached a predetermined frequency, or that the upper limits of the parameters configured in the first game content have reached a cap value.

4. The information processing device according to claim 1, wherein the processor is configured to provide items associated with the first game content.

5. The information processing device according to claim 1, wherein the processor is configured to provide different benefits depending on a class of rarity configured in the first game content.

6. A non-transitory computer readable medium configured to store instructions thereon, which when executed, cause a processor of an information processing device to carry out:
processing to store player information, in which game content owned by a player is configured in association with the player, in a storage unit;
initiate fusion processing for virtual cards, wherein the fusion processing comprises fusing two virtual cards associated with identical characters, each virtual card selected from a set consisting, of virtual cards indicated in the game content as owned by the player;
determination processing to determine whether or not a preset condition associated with fusing a first game content and a second game content used as source material for fusion has been satisfied, the first game content being a first virtual card associated with a first base character stored in the player information, the second game content being a second virtual card associated with a second character stored in the player information, the second character being a source material character for a character fusion operation, the first character associated with upper limits of parameters;

fusion processing during which, before the preset condition is satisfied, the second game content is fused with the first game content to thereby vary upper limits of parameters configured in said first game content in a stepwise manner;

update processing during which, subsequent to the fusion processing, the player information is updated such that said first game content having the varied parameters configured therein is placed in the player's possession while said second game content is not placed in the player's possession; and benefit provision processing during which, once the preset condition is satisfied, the parameters configured in said first game content are initialized and, at the same time, items capable of increasing at least the initialized varied parameters configured in said first game content are provided.

* * * * *